3,019,088
PROCESS FOR PRODUCING HEAVY WATER
Wolf Vielstich, Duisburg-Hamborn, Walter Rottig, Oberhausen-Sterkrade-Nord, and Herbert Spengler, Oberhausen-Holten, Germany, assignors to Ruhrchemie Aktiengesellschaft, Oberhausen-Holten, Germany
No Drawing. Filed Nov. 10, 1958, Ser. No. 772,719
Claims priority, application Germany Nov. 12, 1957
11 Claims. (Cl. 23—204)

This invention relates to a process for the production of heavy water from the water formed during hydrogenation of carbon monoxide.

In the catalytic hydrogenation of carbon monoxide, a major part of the reaction proceeds according to the equation $$CO + H_2 = —CH_2— + H_2O$$

In this reaction, considerable amounts of reaction water may be formed, e.g. 1 ton of water per ton of primary product.

Surprisingly, it has been found that a frequently very considerable enrichment of heavy water always takes place in the water thus formed, this enrichment favoring a commercial utilization. It has been found that heavy water can be produced by recovering the heavy water in a manner known per se from the reaction water obtained in the catalytic hydrogenation of carbon monoxide at an elevated temperature. The favorable conditions existing for this mode of operation become apparent from an examination of the following table showing the enrichment factor of heavy water in the reaction water for various catalyst types and different types of carbon monoxide hydrogenation processes.

| Precipitated iron catalyst: | Enrichment factor |
|---|---|
| Commercial plant | 1.60 |
| Laboratory experiments | 1.50 |
| Sintered iron catalyst | 1.33 |
| Fused iron catalyst | 1.18 |
| Cobalt catalyst: | |
| Atmospheric pressure | 1.14 |
| Medium pressure | 1.12 |
| Methanation with nickel catalyst: | |
| Atmospheric pressure | 1.5 |
| Medium pressure | 1.4 |

These figures demonstrate that the reaction water of the carbon monoxide hydrogenation is enriched in all cases in its content of heavy water. It is possible, therefore, to produce this water with the use of any catalyst suitable for the carbon monoxide hydrogenation and consisting of metals of group 8 of the Periodic Table, but particularly with iron, cobalt and nickel catalysts. These catalysts may be used in various forms, e.g. as precipitated, skeleton, sintered or fused catalysts. The carbon monoxide hydrogenation itself may be operated as fixed bed, fluid bed, moving bed or slurry synthesis, it being possible to use both atmospheric pressure and elevated pressures. The figures shown above indicate that the highest enrichment of heavy hydrogen (enrichment factor 1.6) is obtained in the case of using precipitated iron catalysts, the values obtained on a water sample from a laboratory experiment being in very good agreement with the corresponding figures for a product from a large-scale plant. A somewhat lower enrichment is obtained with so-called sintered catalysts, e.g. those prepared from iron oxide powders by adding certain amounts of activators, e.g. copper oxide and alkali, subsequent molding, sintering and reduction.

When using fused iron catalysts prepared, for example, by fusing very pure, naturally occurring ores after dressing, and employing these materials, e.g. as a pulverulent catalyst for the synthesis at temperatures in excess of 300° C., according to a modern development known as the moving-bed process, the enrichment factor will be further reduced.

It also is of interest that in cases when cobalt catalysts of the composition known for large-scale operations are used, e.g. 100 parts of cobalt, 200 parts of kieselguhr, 5 parts of $ThO_2$ and about 8 parts of MgO, an enrichment of the deuterium component can be observed, this enrichment being independent of the particular pressure applied.

Particularly surprising is the fact that in the process of methanization of gases of quite varying compositions, e.g., city gas and gas for long distance supply, the enrichment factor rises to, viz. 1.4 to 1.5. In that process, as is known, carbon monoxide and carbon dioxide are hydrogenated together with nickel catalysts to methane.

Upon further processing of the reaction water, it sometimes is of advantage to remove oxygen-containing compounds prior to the recovery of the heavy water.

The invention will now be further explained by means of the following examples. However, it should be understood that these are given merely by way of illustration, not of limitation, and that numerous changes may be made in the details without departing from the spirit and scope of the present invention.

*Example 1*

A precipitated iron catalyst prepared according to U.S. Patent No. 2,617,774 by precipitating an iron nitrate solution with a soda solution was used for the synthesis carried out in a commercial reactor having a catalyst volume of 40 m.$^3$ and operated with a gas load of 20,000 normal m.$^3$/hr., a recycle ratio of 1:2.5 and a reaction temperature of between 220 and 240° C. The $CO:H_2$ ratio of the fresh gas was 1:1.7 and the synthesis pressure was 25 kg./cm.$^2$. The enrichment factor of the reaction water produced under these conditions was 1.60.

In a corresponding laboratory test carried out in a tube 10 meters in length and of 32 mm. inside diameter under otherwise identical conditions, an enrichment factor of 1.5 was obtained.

*Example 2*

100 parts of an iron oxide pigment ($Fe_2O_3$) used for industrial purposes were thoroughly mixed with 5 parts of CuO and 5 parts of $K_2CO_3$. The mixture was molded to spherical bodies on a rotary pan by adding little water dropwise, thereafter screened to a particle size of between 2 and 3.5 mm., dried for 24 hours at 120° C. and then sintered for 30 minutes at 1050° C. The sintered catalyst was reduced with hydrogen for 4 hours at a temperature of 380° C. and had a reduction value of 100 percent.

This catalyst was reacted with a hydrogen-rich synthesis gas in the pilot reactor described in Example 1 and operated at a synthesis pressure of 30 kg./cm.$^2$, a gas load of 500 volumes of gas per volume of catalyst per hour, a recycle ratio of 1:2.5 and a temperature of 245° C. The $CO:H_2$ ratio of the gas was 1:2.0 and the CO conversion attained was more than 90 percent.

The enrichment factor of this reaction water was 1.33 and 1.34 respectively as determined in two tests.

*Example 3*

To a fused iron catalyst prepared from a so-called Alan Wood ore from American sources 0.4% $K_2O$ in form of $K_2CO_3$ were added. The mass was crushed and sieved to pass through a screen of 250µ mesh size. This was followed by reduction at 500° C. at a hydrogen pressure of about 10 kg./cm.$^2$ for several hours. This catalyst was subsequently operated in a reactor with a gas under the conditions of the moving-bed synthesis at a high gas load and a CO conversion of 90–95%.

The reaction water obtained under these conditions had an enrichment factor of 1.18.

Example 4

A cobalt catalyst of conventional composition containing 200 parts of kieselguhr, 5 parts of $ThO_2$ and about 8 parts of MgO per 100 parts of cobalt and prepared and reduced in a known manner (see F. Kainer "Kohlenwasserstoffsynthese nach Fischer-Tropsch," page 40) was reacted with a hydrogen-rich gas ($CO:H_2$ ratio 1:2) in a pilot reactor operated at atmospheric pressure, a synthesis temperature of 190° C. and a gas load of 1:100 in a single-pass operation.

The reaction water produced under these conditions had an enrichment factor of 1.14.

If the same catalyst was used at a pressure of 10 kg./cm.$^2$ instead of atmospheric pressure and under otherwise identical conditions, the enrichment factor was found to be 1.4.

Example 5

City gas of usual composition was methanized with a precipitated nickel catalyst as disclosed in German Patent No. 897,547. The gas load was 1000 volumes per volume of catalyst per hour, and the reaction temperature was 192° C. The methanation was effected at atmospheric pressure and in a single pass.

The reaction water obtained under these conditions had an enrichment factor of 1.5.

When a pressure of 10 kg./cm.$^2$ was used instead of atmospheric pressure, the enrichment factor was found to be 1.4.

The measurements of the enrichment factor were effected with a very sensitive and constantly operating mass spectrometer. Prior to the measurements, the sample of the water to be tested was completely decomposed thermally. The enrichment was measured by comparing the line of $H_2^+$ (mass 2) with that of $HD^+$ (mass 3). The $D_2$ molecule (mass 4) in the non-enriched or only slightly enriched hydrogen is present in negligible fractions only. The bands of the different masses, conventionally referred to as peaks, appear in a scanned curve.

Interference of the measurement occurs by the following effect: In the gas discharge, there are also formed $H_3^+$ ions by addition of protons to hydrogen molecules, these $H_3^+$ ions likewise appearing at the point of the mass number 3 and, therefore, interfering with the measurement of the HD component.

The formation of $H_3^+$ ions is dependent upon the pressure and disappears as the pressure decreases. Thus, the influence of the $H_3^+$ ions can be eliminated by reducing the pressure in the spectrometer and extrapolating the intensity ratio of the masses 2 and 3 to zero pressure.

Moreover, the measurements in the different pressure stages were made in the order of mass 2→mass 3→mass 2 to permit any shift of the intensity to be observed by comparing the heights of the peaks to be attributed to mass 2.

We claim as our invention:

1. A process for the production of heavy water, which comprises hydrogenating oxides of carbon in the presence of catalysts of the 8th group of the periodic tables, selected from the group consisting of iron, cobalt, and nickel, collecting the water of reaction formed during hydrogenation and being enriched in deuterium, and recovering the heavy water therefrom.

2. A process for the production of heavy water from the water of reaction formed during catalytic hydrogenation of oxides of carbon, said water of reaction being enriched in deuterium, which comprises carrying out said hydrogenation in the presence of catalysts selected from the group consisting of iron, cobalt and nickel, collecting said water of reaction and recovering the heavy water therefrom.

3. The process according to claim 2, wherein precipitated catalysts are used.

4. The process according to claim 2, wherein skeleton catalysts are used.

5. The process according to claim 2, wherein sintered catalysts are used.

6. The process according to claim 2, wherein fused catalysts are used.

7. The process according to claim 2, wherein the hydrogenation of carbon monoxide is carried out as a fluid bed synthesis.

8. The process according to claim 2, wherein the hydrogenation of carbon monoxide is carried out as a fixed bed synthesis.

9. The process according to claim 2, wherein the hydrogenation of carbon monoxide is carried out as a moving bed synthesis.

10. The process according to claim 2, wherein the hydrogenation of carbon monoxide is carried out as a slurry synthesis.

11. The process according to claim 2, wherein the hydrogenation of carbon monoxide is carried out at elevated pressures.

References Cited in the file of this patent

UNITED STATES PATENTS

| | | |
|---|---|---|
| 2,438,449 | Mosesman | Mar. 23, 1948 |
| 2,440,109 | Moore | Apr. 20, 1948 |
| 2,525,827 | Riblett | Oct. 17, 1950 |
| 2,690,379 | Urey et al. | Sept. 28, 1954 |
| 2,756,247 | James et al. | July 24, 1956 |